April 14, 1970     H. G. OSTWALD ET AL     3,506,797
SWITCH ACTUATING ARRANGEMENT INVENTOR
Heinz Georg Ostwald
BY Michael S. Striker
ATTORNEY

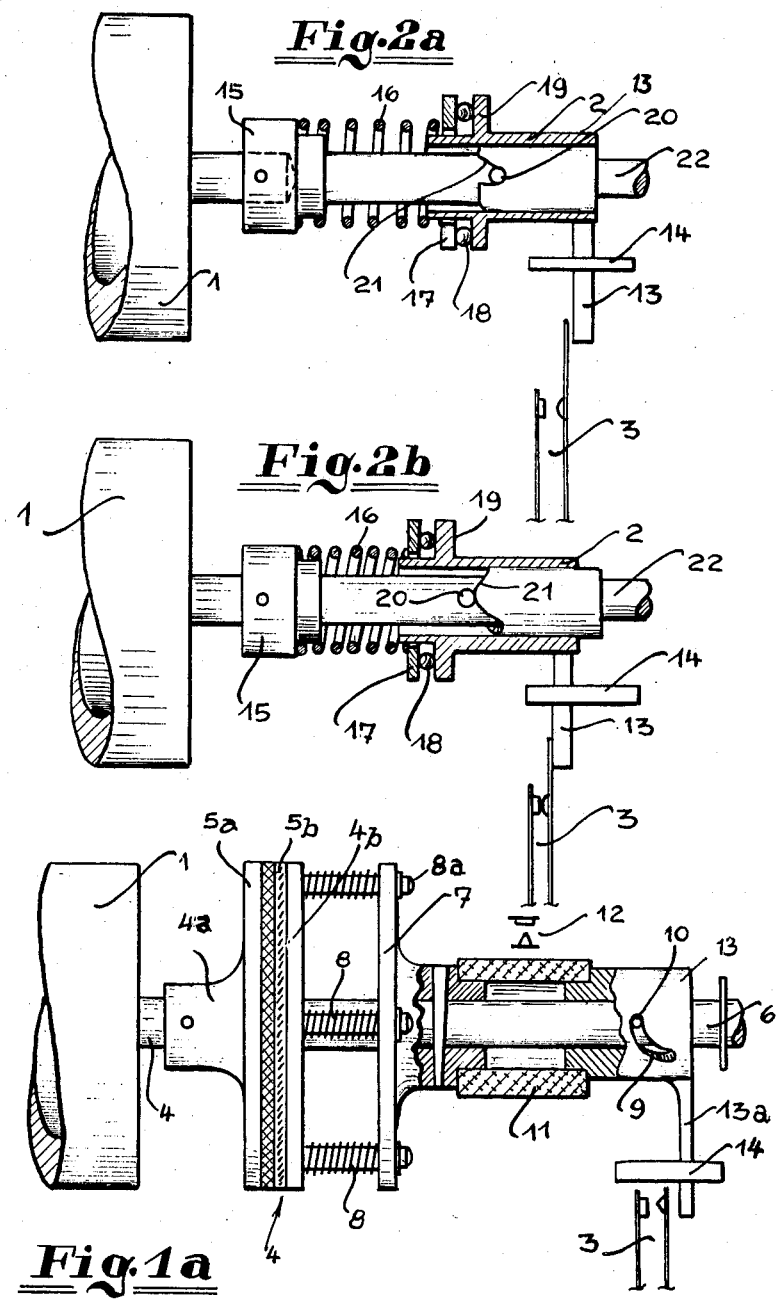

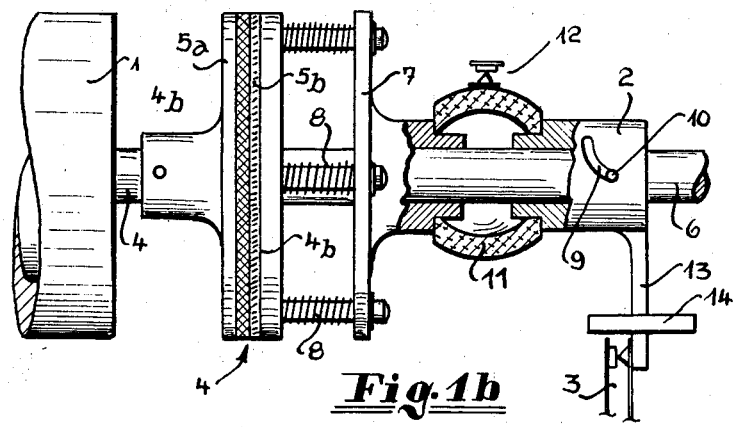
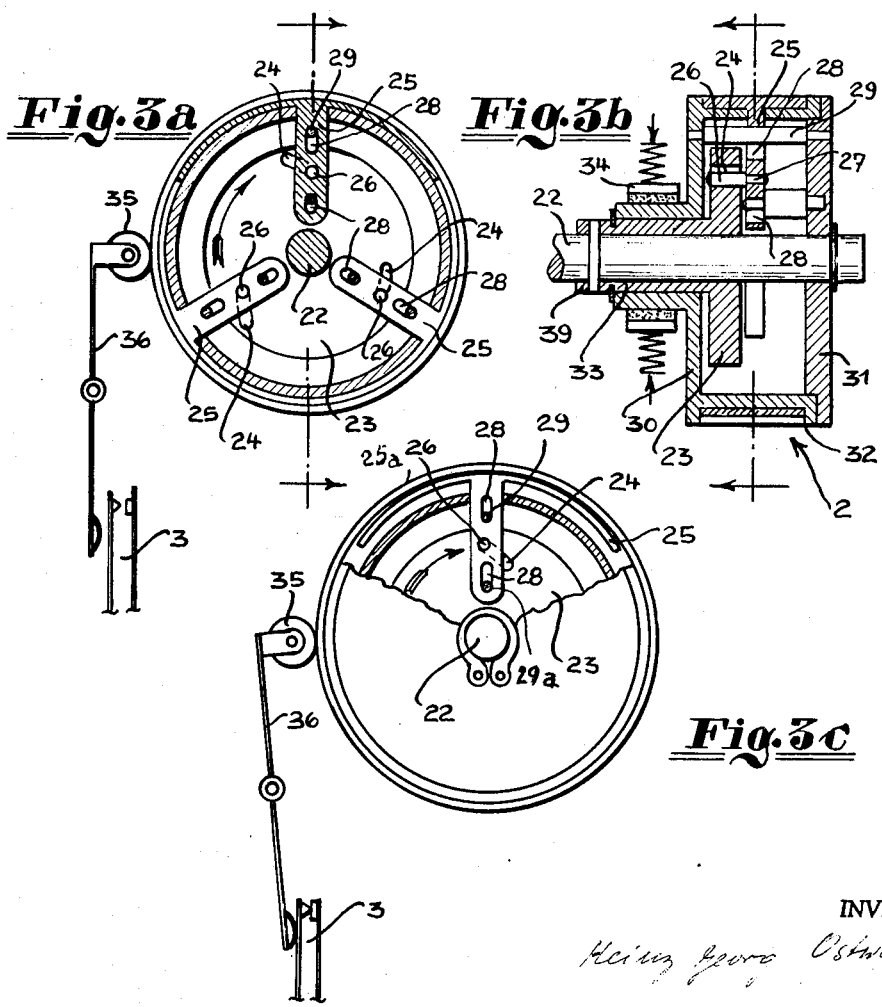

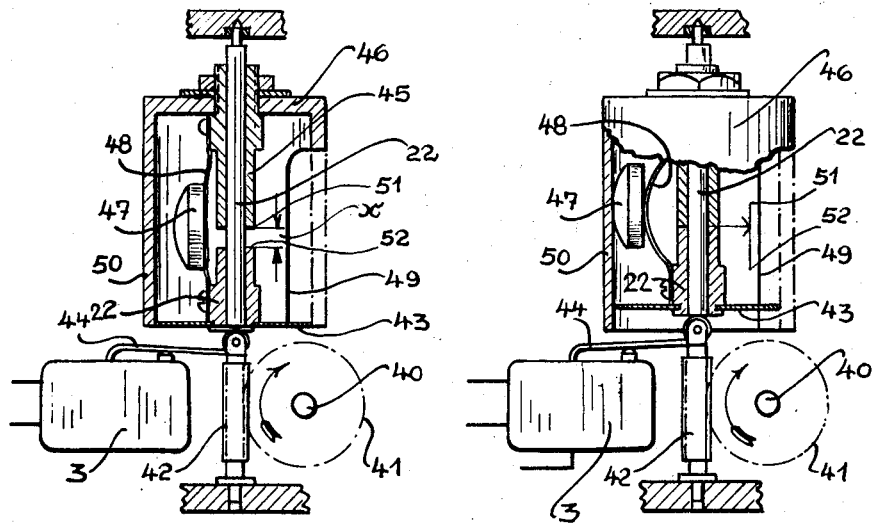
*Fig.4a*  *Fig.4b*
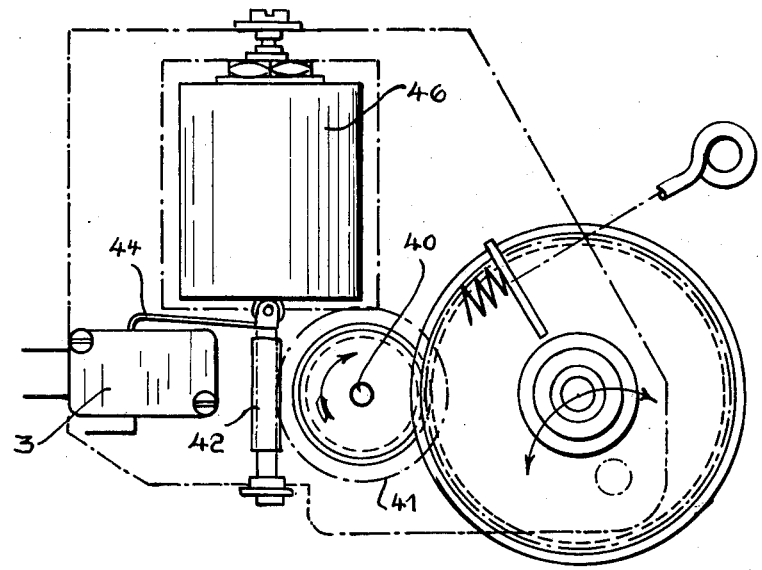
*Fig.4c*
INVENTOR
Heinz Georg Ostwald
BY Michael S. Striker
ATTORNEY

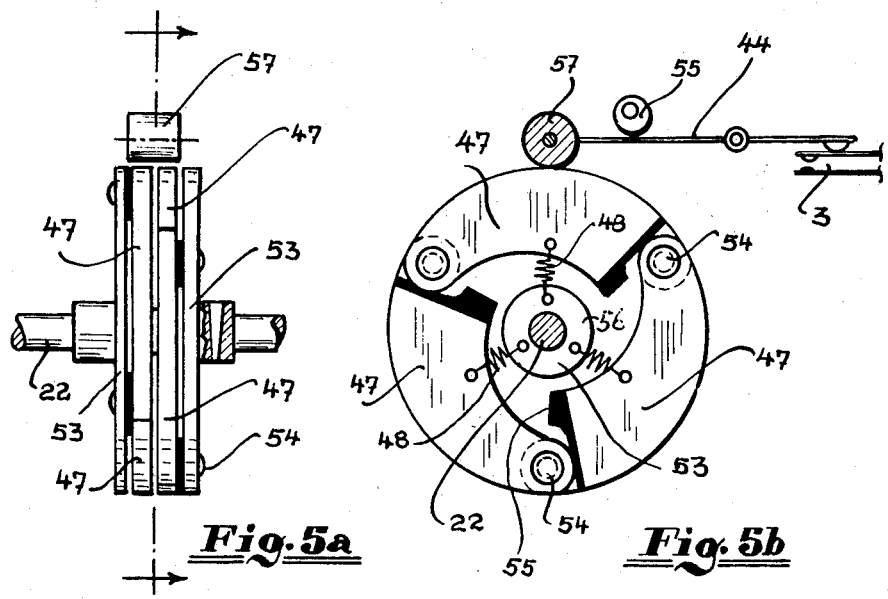
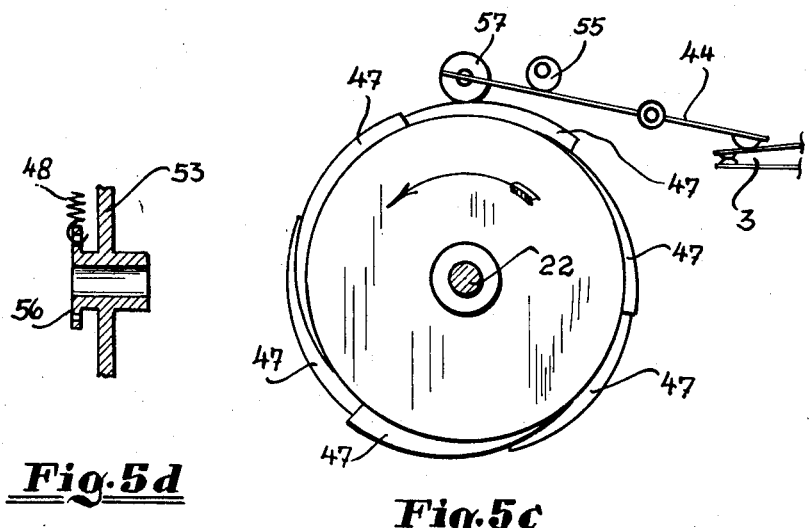

| United States Patent Office | 3,506,797 |
|---|---|
| | Patented Apr. 14, 1970 |

3,506,797
SWITCH ACTUATING ARRANGEMENT
Heinz Georg Ostwald, Frankfurt am Main-Bonames, Germany, assignor to Eichner Organisation G.m.b.H., Neuenhain, Taunus, Germany
Filed Aug. 21, 1967, Ser. No. 662,123
Claims priority, application Germany, Aug. 20, 1966, E 32,325
Int. Cl. H01h 35/06
U.S. Cl. 200—61.46          4 Claims

ABSTRACT OF THE DISCLOSURE

The source of light by which photosensitive papers are exposed in a copying machine, is automatically disconnected by opening a switch when the speed of the transporting roller of the papers drops below a predetermined minimum speed so that damage to the papers by overheating is prevented. The actuating means of the switch are stopped after actuation to prevent damage to the switch.

BACKGROUND OF THE INVENTION

Copying machines are provided with transporting rollers which transport originals and copy sheets past a source of light by which the copy sheet is exposed. The lamp used for this purpose produces very great heat which would damage the papers if the transporting speed drops below a predetermined speed.

SUMMARY OF THE INVENTION

It is one object of the invention to overcome this disadvantage of known copying machines, and to provide an arrangement for automatically disconnecting the source of light of a copying machine when the transporting speed drops below a predetermined minimum speed.

Another object of the invention is to provide a switch actuating arrangement which operates a switch whenever the speed of a rotary member drops below a predetermined speed, and to close the switch only when the rotary member rotates at a speed higher than the predetermined minimum speed.

With these objects in view, a switch actuating arrangement in accordance with the invention comprises a rotary member, such as the transporting roller of a copying machine, switch means for a circuit cooperating with the rotary member and preferably connected to the source of light by which copy sheets transported by the rotary member are exposed; actuating means having an operating position and a disconnecting position for operating the switch means to close and interrupt the circuit, respectively; control means connecting the rotary member with the actuating means for moving the same to the operating position and to the disconnecting position, respectively, when the rotary member rotates at the rotary speed above and below a predetermined minimum speed; and means limiting movement of the control means after movement of the actuating means while said rotary member continues to rotate.

In the preferred embodiment of the invention, the control means include means which bias or urge the actuating means into the disconnecting position, and force transmitting means for transmitting to the actuating means a force overcoming the force of the biasing means only when the rotary speed of the rotary member exceeds the minimum speed.

In other words, the circuit is closed only when the rotary member, for example the transporting roller of a copying apparatus, rotates at a sufficiently high speed so that overheating of the copied papers is prevented, while the control means and actuating means perform a limited movement, irrespective of the fact that they are driven from the continuously rotating transporting roller.

In the invention, the control means include centrifugal weights which move a limited distance when the speed of the rotary member is increased above the minimum speed, and operate the actuating means and thereby the switch means. Preferably an abutment member limits the movement of the centrifugal weights so that damage to the apparatus at high speeds substantially exceeding the minimum speed at which the centrifugal weights are operated, is prevented.

The actuating means preferably include an actuating lever for operating the switch means, and the actuating lever may be movable in the direction of the axis of rotation of the centrifugal weights.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIGS. 1a and 1b are elevations, partially in section, illustrating a first device in two operational positions;

FIGS. 2a and 2b are elevations illustrating a second device in two operational positions;

FIG. 3a is a cross sectional view, FIG. 3b is an axial sectional view, and FIG. 3c is a front view, partially in section illustrating a third device, FIGS. 3a and 3b illustrating the arrangement in a position of rest, and FIG. 3c is an operating position;

FIGS. 4a and 4b are sectional views illustrating two operational positions, and FIG. 4c is a front view illustrating an embodiment of the invention;

FIG. 5a is a side elevation, FIG. 5b is a front elevation, FIG. 5c is a schematic side elevation, and FIG. 5d is a sectional view of a detail of a fifth device, FIGS. 5a and 5b illustrating a first operational position, and FIG. 5c a second operational position;

Figures 6A, 6B:
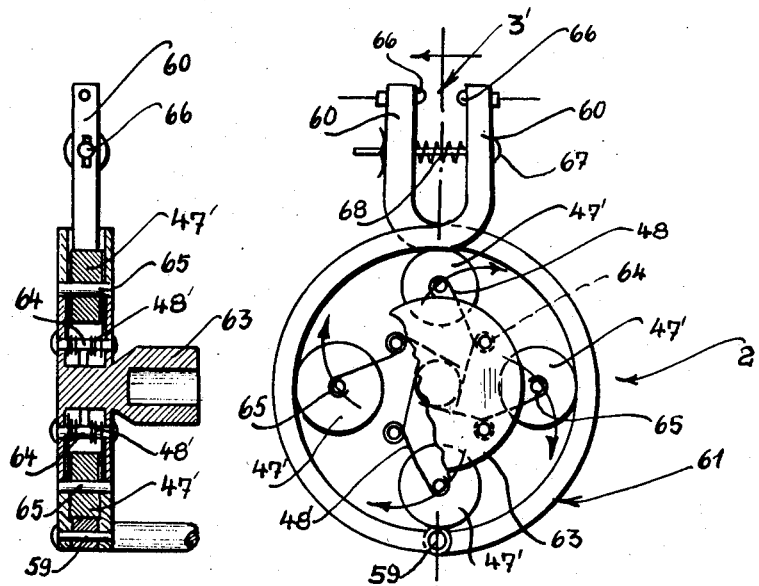
FIG. 6a is an axial sectional view.
FIG. 6b is a front view in a first operational position.

DESCRIPTION OF THE INVENTION AND SIMILAR DEVICES EMBODYING MANY FEATURES OF THE INVENTION

Referring now to the drawings in which corresponding parts of different embodiments are indicated by like reference numerals, in the embodiment of FIGS. 1a and 1b, a rotary member 1, such as the transporting roller of a copying apparatus which transports a document and a copy sheet past a source of light producing heat, is connected by control means and actuating means 2 with a switch 3 controlling the circuit of the source of light. As long as the rotary member 1 rotates at a speed above a predetermined minimum speed, portions of the document and copy sheet heated during passage of the source of light, cool off again so that the document and copy sheet are not damaged. However, if the rotary speed of transporting member 1 drops below a certain rotary speed, the papers are heated excessively and will be damaged. Consequently, switch 3, which connects the source of light to a voltage source, is opened in accordance with the invention when the rotary speed of transporting member 1 drops below a minimum speed, and is also opened when transporting member 1 is at a standstill, or is being accelerated to the proper operating speed.

FIG. 1a illustrates the apparatus with switch 3 in the open position, and transporting member 1 may be at a standstill in the position of FIG. 1a.

Transporting roller member 1 has a shaft 4 to which a first coupling member 4a having a lining 5a is secured. The other coupling member 4b of friction coupling 4 has a lining 5b abutting lining 5a under the action of springs 8 which abut a flange member 7 which has bores through which bolts 8a surrounded by springs 8 pass. Flange member 7 is supported for rotation in a bearing, and connected by a pin 7a with a shaft 6 which rotates together with flange member 7 and coupling member 4b.

The hub of flange member 7 is connected by a resilient sleeve 11 with an actuating means for switch 3 in the form of a sleeve 13 having a projection 13a slidably guided on a fixed stop 14. Shaft 6 has a fixed stud 10 located in an arcuate guide slot 9 of sleeve 13 so that turning of shaft 6 with stud 10 causes axial movement of actuating sleeve 13 with projection 13a between the positions illustrated in FIGS. 1a and 1b for opening and closing switch 3. When actuating means 13 is in the operating position shown in FIG. 1b, resilient sleeve 11 is compressed and forms a bulge by which another switch 12 is closed.

In the position of FIG. 1b, rotary member 1 rotates at the normal speed required for transporting the papers past the source of light, and a rotary motion is transmitted by friction coupling 4 to a flange member 7 and shaft 6 so that stud 10, acting on the walls of slot 9, forces actuating means 13 to the operating position in which switch 3 is closed. At the same time, resilient sleeve 11 is compressed and forms an annular bulge for engaging and closing switch 12. Switch 3 controls the flow of current to the source of light by which the photosensitive copy sheet is exposed, and switch 12 may be used for the same purpose, or for closing another circuit required for the operation of the copying machine.

The resilient sleeve 11 exerts in the deformed condition shown in FIG. 1b pressure on actuating means 13 to move the same from the position of FIG. 1b to the position of FIG. 1a, but as long as the rotary speed of member 1 is above a certain predetermined speed, the torque transmitted to actuating means 13 by coupling 4 is sufficient to maintain actuating means 13 in the operating position of FIG. 1b, and since stop 14 prevents rotation of actuating means 13, coupling member 4a, 5a slides on coupling member 4b, 5b so that transporting member 1 can rotate at a very high speed.

When the speed of transporting member 1 drops below the predetermined minimum speed at which the heat of the source of light may detrimentally affect the papers transported by a transporting member 1, the resilient force of the deformed resilient sleeve 12, which consists of a suitable elastomer, is sufficient to urge actuating means 13 from the position shown in FIG. 1b to the disconnecting position shown in FIG. 1a in which switches 3 and 12 are permitted to open under the action of contact springs. The movement of actuating means 13 under the action of the resiliently expanding control sleeve 11 is accompanied by a turning movement transmitted by stud 10, shaft 6, and flange member 10 to coupling member 4b, 5b which turns relative to coupling member 4a, 5a, which is possible at reduced speed of transporting member 1, and particularly when the same is stopped or jammed.

In the embodiment illustrated in FIGS. 2a and 2b, transporting member 1 has a shaft secured to a coupling member 15 in the form of a stepped cylinder on which a spring 16 abuts. Coupling member 15 is secured to shaft 22 carrying a fixed tubular cam 21 which has an annular cam track cooperating with a cam follower stud 20 fixed to a sleeve 13 which is freely turnable thereon. Sleeve 13 has a fixed flange 19 forming one part of a ball bearing including bores 18 and a ring 17 surrounding sleeve 13 and being held in position by spring 16. A projection 13a of sleeve 13 slidingly engages a fixed stop 14 and limits turning movement of sleeve 13. Projection 13a cooperates with switch 3 which controls the circuit of the source of light which illuminates a peripheral section of transporting member 1. The cam track of cam 21 has a recessed portion best seen in FIG. 2a, and a dwell best seen in FIG. 2b.

In the position of FIG. 2a, transporting member 1 is at a standstill, and control means 16, 17, 18, 19 urge actuating means 13, 13a to a disconnecting position in which switch 3 is open. Cam follower stud 13 is located in the recess of cam 21.

When transporting member 1 is rotated by a drive means of the apparatus, not shown, control means 15, 22 and 21 turn, and follower stud 20 is urged to the position of FIG. 2b by the dwell of cam 21 so that control spring 16 is compressed due to the axial displacement of actuating means 13 to which follower stud 20 is secured. The force of control spring 16 acts to return sleeve 13 with follower stud 20 to the position of FIG. 2a, but spring 16 is dimensioned, and the mass of sleeve 13 is selected so that during rotation of transporting member 1 at a predetermined speed, the high portion of cam 21 engages stud 20 during each revolution of transporting member 1 with shaft 22 and cam 21 in such rapid succession that follower stud 20 cannot move to the recess of the cam track of abutting means in the position illustrated in FIG. 2b so that reciprocating motion of actuating means 13 ends when transporting member 1 rotates at the desired proper speed.

However, when the rotary speed of transporting member 1 drops below a predetermined minimum speed, rotation of cam 21 is slower, and spring 16 can urge actuating means 13 to a position in which follower stud 20 is located in a recessed portion of the cam track so that projection 13a permits the contact spring of switch 3 to open the same for disconnecting the source of light.

In the embodiment illustrated in FIGS. 3a, 3b and 3c, the rotary transporting member, not shown, is secured to a shaft 22 which projects through a housing including a main housing part 30, and a closure plate 31 having a bearing for shaft 22. Three segments 25 are mounted on a spherical wall portion of main housing part 30 and have arcuate peripheral portions, and radially inward projecting portions to which the stems 27 of follower pins 26 are riveted. The three segments 25 are respectively guided for radial movement by pins 29 passing through slots 28 while connecting housing parts 30 and 31, and by pins 29a located in other radially extending slots 28 and secured to housing part 31, as best seen in FIG. 3b. The ring 32 consisting of elastic material surrounds the segments 25 and holds the same in the position illustrated in FIGS. 3a and 3b.

A control member 23 has a hub portion 39 secured to shaft 22 by a transverse pin, and rotating with the same. Control member 23 has a flange with three slanted cam slots 24, best seen in FIG. 3c into which follower pins 26 of the three segments 25 project. A brake 34 loaded by springs surrounds a hub portion 33 of housing part 30 and resists rotation of housing 30, 31 with segments 25.

Resilient ring 32 is in contact with a roller 35 on a lever 36 which controls switch 3 which is connected into the circuit of the source of light by which papers transported by the transporting roller on shaft 22 are exposed.

When shaft 22 with the transporting roller is at a standstill, the apparatus is in the position illustrated in FIGS. 3a and 3b. The resilient ring 32 is contracted and holds segments 25 in the illustrated inner position so that follower pins 26 are located at the inner ends of cam slots 24 whereby control member 23 is turned in counterclockwise direction a small angle determined by the length of cam slots 24 relative to segments 25. Brake 34 holds housing 30, 31 in the corresponding angular position. Since resilient ring 32 is contracted, switch 3 is permitted to open by lever 36, and the source of light is disconnected so that papers supplied to the transporting roller cannot be overheated.

When rotation of the transporting member is started, control cam 23 rotates in clockwise direction of the arrow in FIG. 3a so that cam slots 24 urge follower pins 26 to move in outward direction so that segments 25, guided by pins 29 and 29a move outward and expand with their peripheral portions 25a the resilient ring 32 to greater diameter so that roller 35 and lever 36 are displaced and switch 3 is closed.

Housing 30, 31 is coupled by pins 29, 29a, segments 25, and follower pins 26 with the rotating control cam member 23, and rotates with the same in the position of FIG. 3c while being braked by brake 34. At the required high speed, the action of brake 34 does not describe the above explained operation, but the force of brake 34 determines the inertia of the movement and counteracts the torque acting on the control and actuating means 2 of switch 3.

However, if the rotary speed of the transporting roller and of shaft 22 drops below a predetermined minimum speed, or when shaft 22 is stopped, the force of brake 34 is sufficient to turn the housing 30, 31 with segments 25 relative to shaft 22 and control cam member 23 to the position illustrated in FIGS. 3a and 3b in which the resilient ring 32 moves with segments 25 in a position permitting lever 36 to assume a position in which switch 3 is open. The action of the resilient ring 32 corresponds to the action of spring 16 in the embodiment of FIGS. 2a and 2b, and of the resilient sleeve 11 in the embodiment of FIGS. 1a and 1b.

In the invention, as illustrated in FIGS. 4a, 4b and 4c, shaft 40, which is driven from the transporting roller, carries a worm gear 41 meshing with a worm 42 on control shaft 22. A sleeve 45 is secured to control shaft 22 and carries a bell-shaped member 50 whose open end guides a disk 43 secured to an actuating sleeve 22 which is slidable in axial direction of control shaft 22. Springs 48 connect sleeves 45 and 22 and carry centrifugal weights 47 respectively located opposite wall portions of bell-shaped member 50 which is formed with cut-outs 49 intermediate the portion engaged by weights 47 so that the engaged portions can yield under the pressure of the weights.

Switch means 3 is actuated by a lever 44 which carries a follower roller abutting disk 43. In the position of rest of the apparatus, when the transporting roller does not rotate with shaft 40, actuating disk 43 is in the position of FIG. 4a and operates actuating lever 44 to open switch means 3. In this position of disk 43 and actuating sleeve 22, the end face 52 of the same is spaced a distance x from the corresponding end face 51 of sleeve 45, and the faces of sleeves 45 and 22, on which the ends of leaf springs 48 rest, are spaced apart so that the centrifugal weights 47 are in the inner position shown in FIG. 4a.

As long as the transporting roller is at a standstill, or rotates at a speed below a predetermined minimum speed, the apparatus is in the position of FIG. 4a, and worm gear 41 rotates worm gear 42 and shaft 22 with sleeve 45 and bell-shaped member 50 at a speed in which centrifugal weights 47 are only slightly outwardly displaced and do not touch the inner surface of bell-shaped member 50. Leaf springs 48 urge actuating sleeve 22 downward away from sleeve 45 so that actuating lever 44 holds switch means 3 open.

When the speed of the transporting roller, and of control shaft 22 exceeds the predetermined minimum speed, centrifugal weights 47 move outwardly far enough to abut the inner surface of bell-shaped member 50, and remain in this position irrespective of further increases of the rotary speed. Since leaf springs 48 are deformed by the weights 47, actuating sleeve 22 is pulled to the end position of FIG. 4b abutting the end of sleeve 45 so that actuating disk 43 is raised and permits actuating lever 44 to move to a position in which switch means 3 is closed so that the apparatus can be operated with a source of light connected to a voltage source. The operative position of FIG. 4b is assumed at the minimum speed at which the centrifugal force exerted by the centrifugal weights 47 on leaf springs 48 is sufficient to deform the same to such an extent that weights 47 abut member 46. The engaged wall portions 50 of the bell-shaped member 46 yield to the centrifugal force a small distance determined by the wall thickness and the properties of the material whereupon actuating sleeve 22 abuts sleeve 45 in the end position of FIG. 4b. The safety of the operation is improved by this arrangement which requires certain dimensions of the bell-shaped member 46, 50 of the gap between end faces 51 and 52. Due to the yielding and elastic deformation of the portions of bell-shaped member 50 engaged by the weights, the impact of the sleeve or abutment means 22 on the sleeve or abutment means 45 is reduced and the last part of the movement of sleeve 22 is dampened.

When the rotary speed of the transporting member drops, the rotary speed of shaft 22 is reduced, and below the predetermined minimum speed, springs 48 retract the centrifugal weights 47 so that actuating means 22, 43 is pushed downward and operates actuating lever 44 to open switch means 3.

In the embodiment of FIGS. 5a–5d the centrifugal force exerted by centrifugal weights at a speed exceeding a predetermined minimum speed is used for closing switch 3 by which the source of light, for example, of a copying apparatus is connected to a voltage source.

Control shaft 22 of the transporting roller is secured to two carriers 53 on each of which centrifugal weights 47 are mounted for pivotal movement on pivot journals 54. Centrifugal weights 47 are arcuate to form a substantially circular peripheral outline in an inner position into which they are drawn by springs 48 secured to hubs 56 of carriers 53, see FIG. 5d. When the outer edges of centrifugal weights 47 are located along a circle, the end faces of the centrifugal weights abut stop portions 55 laterally projecting from carrier disks 53.

The actuating lever 44 has one end cooperating with switch 3, and another end rotatably carrying a roller 57 turning on the peripheral edges of centrifugal weights 47. An eccentric stop 55 limits turning movement of actuating lever 44 in the switch closing motion of FIG. 5c.

In the inoperative position shown in FIGS. 5a and 5b, shaft 22 is at a standstill, or rotates at low speed so that the centrifugal force acting on weights 47 cannot overcome the force of the springs 48 so that the weights remain in the inner position in which roller 57 is not sufficiently displaced to close switch 3 so that the circuit of the source of light is interrupted.

When the transporting roller is started, and shaft 22 rotates with carriers 53, the centrifugal weights 47 are outwardly displaced against the action of springs 48 and assume the projecting position shown in FIG. 5c in which the two sets of centrifugal weights 47 which are respectively mounted on the two carriers 53, alternately engage roller 57 of actuating lever 44 for closing switch 3. The mass of roller 57 is selected so that the actuating means 57, 44 remain in the switch closing position when momentarily not engaged by one of the centrifugal weights 47 during the rapid rotation of the same with carriers 53.

Figure 6C:
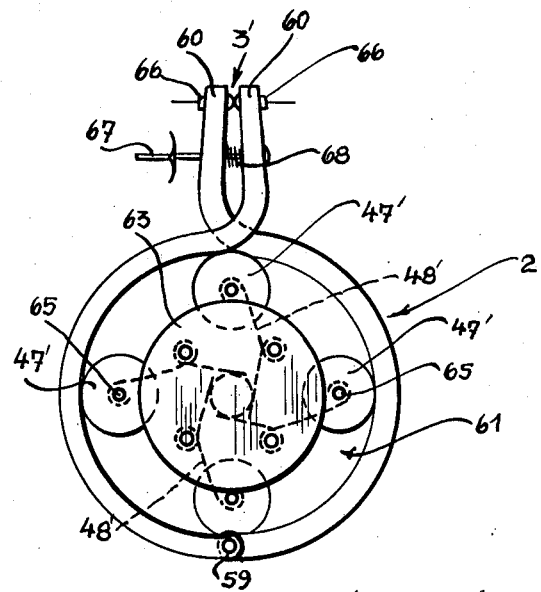
FIG. 6c is a front view in a second operational position of a sixth device.

In the embodiment illustrated in FIGS. 6a, 6b and 6c, the control and actuating means 2 include a pair of members 61 which are pivotally connected at 59, each member 61 being composed of a semicircular portion and of a straight portion 60 projecting from the same, members 60, 61 crossing like scissors. The switch 3' includes two contacts 66 mounted on portions 60, respectively and adapted to engage each other in the position of FIG. 6c. A spring 68 mounted on a pin 67 passing through portions 60 urges the same apart to the position of FIG. 6b in which switch 3' is open. Centrifugal weights 47' in the form of rollers are mounted on the first arms of the springs 47' whose other arms abut the rotary member 63 on which springs 48' are mounted by means of pins 64. Centrifugal rollers weights 65 are mounted on pins 65 carried by arcuate portions of springs 45 which hold the rollers 47' in contact with the inner surface of actuating members 61.

When rotary member 63, which is driven from the transporting roller, is at a standstill, or rotates at a low speed, the force of spring 68 is sufficient to hold actuating members 61, 60 in the disconnecting position shown in FIG. 6b in which contacts 66 are separated.

When the minimum speed of the transporting roller is exceeded, so that the papers transported by the same cannot be overheated by the source of light, the centrifugal weights 47' have moved outwardly against the action of springs 48' to a position forcing members 61 apart so that portions 60 approach each other and contacts 66 engage and close the circuit of the source of light.

When the rotary speed of the transporting roller and of rotary member 63 drops below the predetermined minimum speed, control spring 68 urges portions 60 apart and opens switch 3'. The tension of torsion springs 48', which have central portions wound about pins 64 between carrier plates 63, is reduced and centrifugal weights 47' move inward.

Figure 7A:
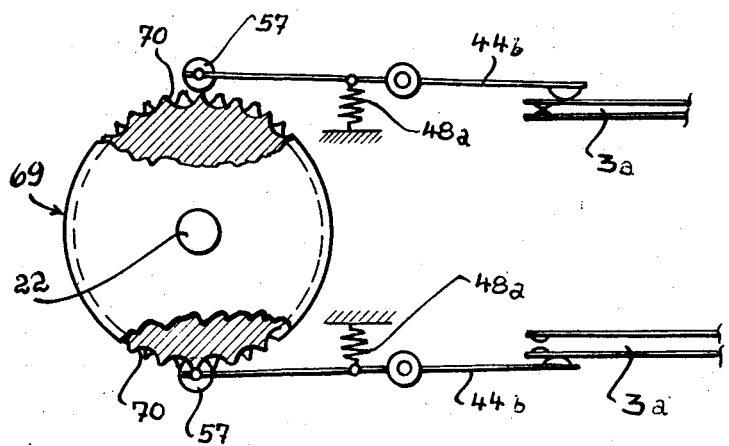
FIGS. 7a and 7b are elevations, partially in section, illustrating a seventh device in two operational positions.
Figure 7B:
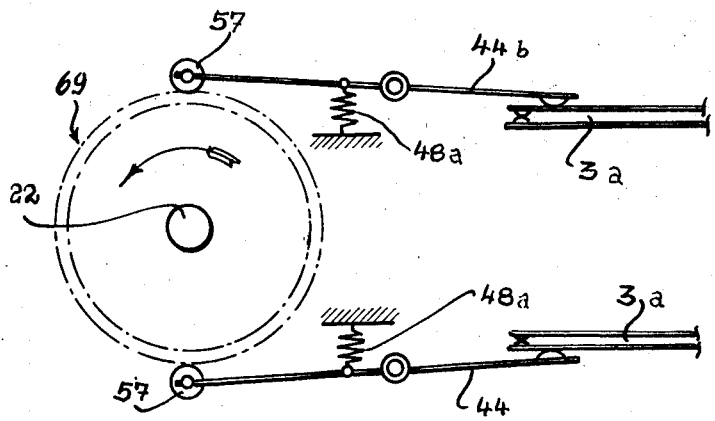
Figure 7C:
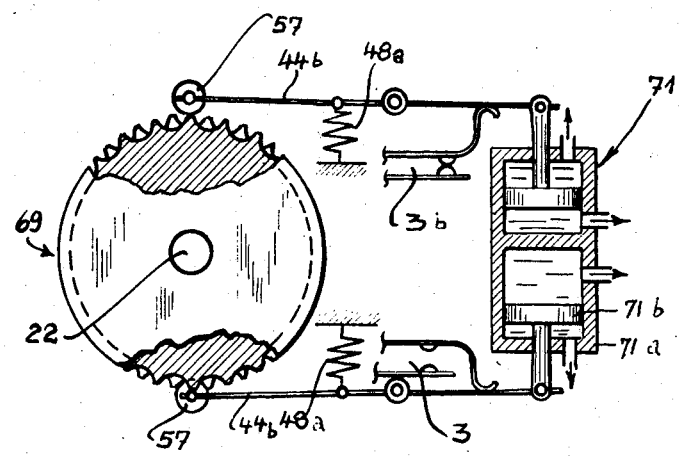
FIGS. 7c and 7d are elevations partially in section illustrating a modification of the device of FIGS. 7a and 7b.
Figure 7D:
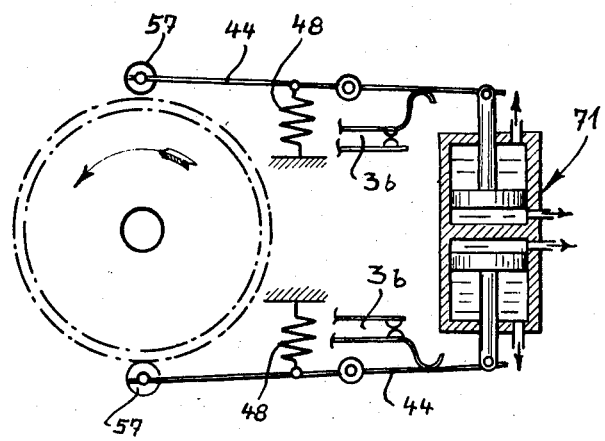

In the embodiment illustrated in FIGS. 7a and 7b and in the modified embodiment illustrated in FIGS. 7c and 7d, control shaft 22 of the transporting roller carries two toothed wheels 69 which have teeth and notches staggered relative to each other so that a tooth of one toothed wheel is axially aligned with a notch of the other toothed wheel 69.

Rollers 57 are located in diametrically opposite positions respectively engage the toothed rims of wheels 69 under the action of springs 48a which act on levers 44 whose other ends cooperate with switches 3a which are connected in series. The arrangement is such that one roller 57 engages a tooth of one wheel 69 while the other roller 57 is located in a notch of the other wheel 69. Consequently, the upper switch 3a is closed in the position of FIG. 7a, while the lower switch 3a is opened. Switches 3a are connected to the source of light so that it is necessary for both switches 3a to close in order to connect the source of light to the voltage.

While the transporting roller and shaft 22 with toothed wheels 69 are at a standstill, or rotate at a low rotary speed, one of switches 3a is always closed when the other is opened. However, when the predetermined minimum speed is exceeded, the inertia of rollers 57 and levers 44 is sufficient to hold rollers 57 in the outer positions even if the respective roller is located opposite a notch so that both switches 3a are closed and the circuit completed.

When the rotary speed of the transporting roller drops below the predetermined minimum speed, control springs 48a pull rollers 57 inward into the switch opening position when located opposite a notch of the respective toothed wheel 69. Since one switch 3a is always open when the other closes, the source of light is disconnected from the voltage.

In the modified embodiment of FIG. 7c, switches 3b are somewhat differently constructed, but are also connected in series and operate as described with reference to switches 3a. The ends of levers 44b are respectively connected with the pistons of a damping device 71 which has a cylinder 71a with chambers for pistons 71b and inlet and outlets for a liquid so that levers 44b with rollers 57 very slowly follow the action of control springs 48a when a notch is located opposite a roller 57.

Figure 8A:
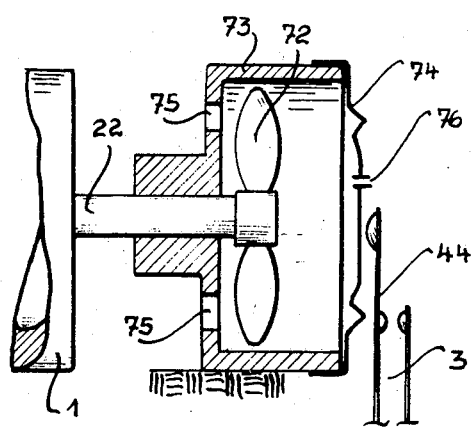
FIGS. 8a and 8b are elevations, partially in section illustrating an eighth device in two operational positions.
Figure 8B:
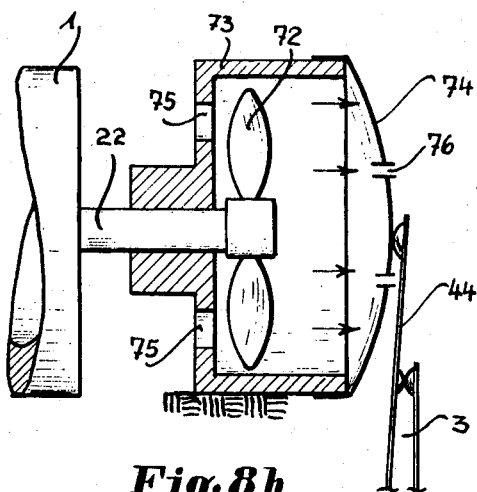

In the embodiment illustrated in FIGS. 8a and 8b, transporting roller 1 has a shaft 22 which carries an impeller wheel 72 located in a housing 73 which has a bearing on which shaft 22 is supported. Housing 73 is pot-shaped and has an open end closed by diaphragm 74 which has outlet openings 76 for air drawn into housing 73 through inlet openings 75. Outlet openings 76 are small enough to have a throttling effect on the air transported by impeller 72.

The actuating arm 44c of a switch 3, which is connected to a source of light, is located opposite diaphragm 74.

In the position of FIG. 8a, transporting roller 1 is at a standstill and impeller 72 does not rotate, so that the diaphragm 74 is in the collapsed illustrated position and switch 3 is open so that the circuit of the source of light is interrupted.

In the position of FIG. 8b, transporting roller 1 rotates at a speed exceeding a predetermined minimum speed so that the air pumped by impeller 72 through inlet opening 75 into the chamber 73, 74 increases the pressure in the same and pushes the diaphragm 74 outward to a position engaging actuating arm 44c for closing switch 3. When the rotary speed of transporting member 1 is further increased, air is discharged in greater quantities through outlet openings 76, and the switch remains closed.

If the rotary speed of transporting member 1 drops below the predetermined minimum speed, the resilient force of diaphragm 74 is sufficient to overcome the pressure in the impeller chamber, and the diaphragm assumes the position of FIG. 8a, permitting switch 3 to open and disconnect the source of light.

Figure 9A:
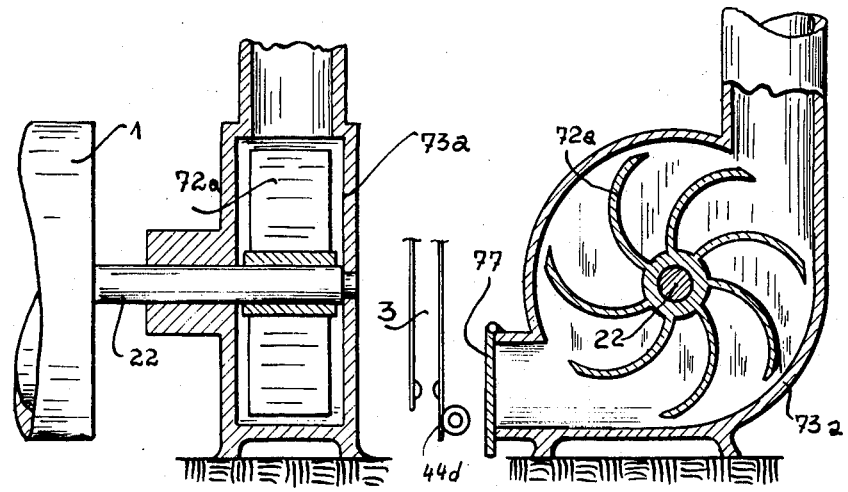
FIGS. 9a and 9b are cross sectional views of a ninth device in two operational positions, and FIGS. 9a' and 9b' are axial sectional views of this device.
Figure 9B:
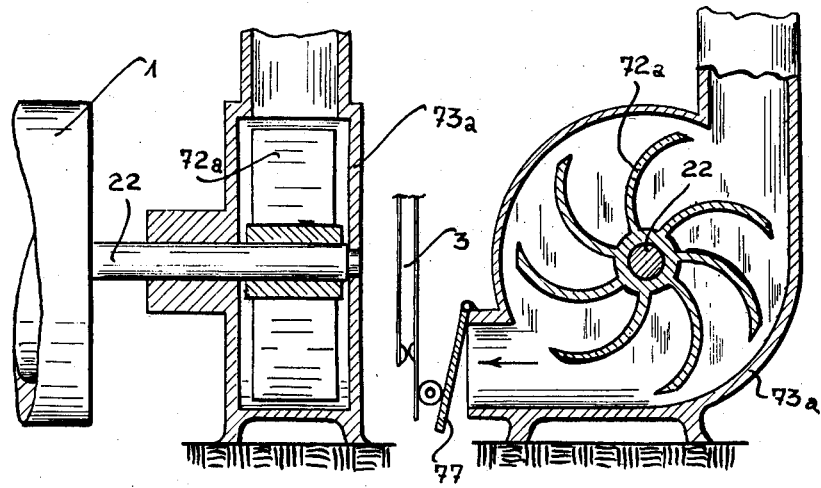

The embodiment illustrated in FIGS. 9a and 9b operates on a similar principle, and transporting roller 1 and shaft 22 drive an impeller 72a located in a housing 73a which has an outlet opening closed by a pivotally mounted flap 77 cooperating with an actuator arm 44d having a roller and being connected with switch 3. At a standstill or low speed of transporting roller 1, the pressure produced by impeller 72 is insufficient to move flap 77 to a switch closing position, but above the predetermined minimum speed, flap 77 is moved to the position of FIG. 9b and effects closing of switch 3 so that the source of light is connected to the voltage. The mass of flap 77 is selected to determine the minimum speed at which switch 3 is operated. In the embodiment of FIGS. 8a and 8b, the elasticity of the diaphragm 74 is selected to determine the minimum speed at which switch 3 is operated.

Figures 10A, 10C:
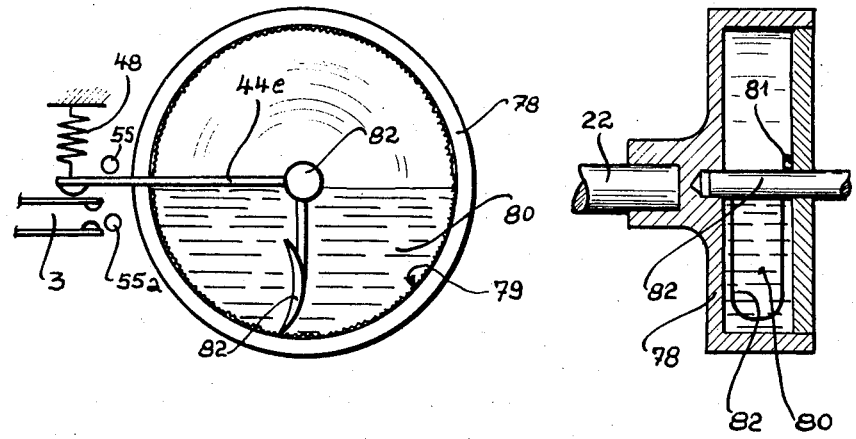
FIGS. 10a and 10b are cross sectional views.
FIG. 10c is an axial sectional view illustrating a tenth device in two operational positions.
Figure 10B:
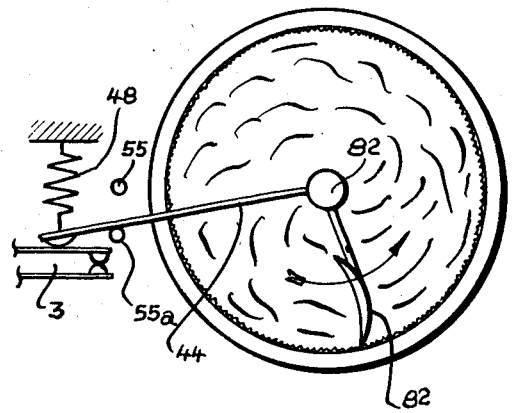

In the embodiment of FIGS 10a and 10b, shaft 22 of the transporting member carries a housing 78 which has a rough inner surface 79 by which a liquid or powder 18 is carried up during rotation of the housing. A shaft 82 is mounted in a bearing 81 and carries a vane 82 which is located in the liquid 80. An actuator arm 44e is secured to shaft 82 and projects through an opening in housing 78 above the level of the liquid into the region of switch 3. A spring 48 biases actuating arm 44e against a stop 55 away from switch 3.

When housing 78 is rotated by shaft 22, the rough inner surface of housing 78 drives the liquid, and above a predetermined minimum speed, the pressure of the liquid on vane 82 is sufficient to displace the same until actuating arm 44e abuts stop 55 while closing switch 3. When the rotary speed of the transporting roller 1 drops below the predetermined minimum speed, the pressure of the liquid on vane 82 is insufficient to overcome the force of spring 48 sufficiently to actuate switch 3 so that the same opens. The rough inner surface 79 of housing 78 counteracts the inertia of the mass of the liquid 80 and overcomes the kinetic energy of the same.

Figure 11A:
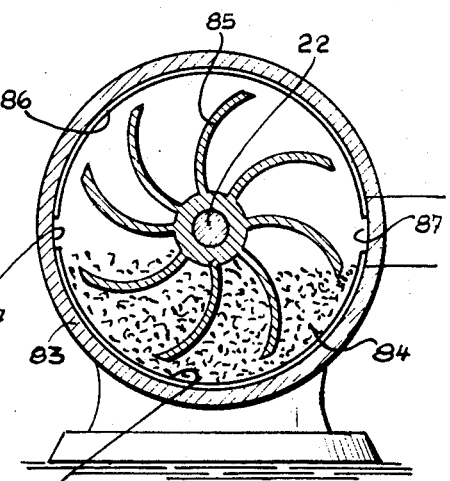
FIGS. 11a and 11b illustrate an eleventh device in two operational positions.
Figure 11B:
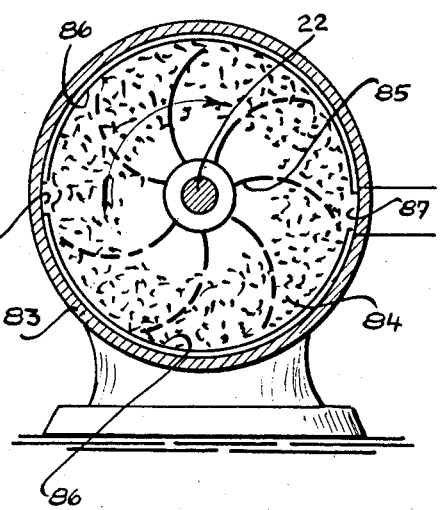

In the embodiment illustrated in FIGS. 11a and 11b, a cylindrical housing 83 is partly filled with a metal powder 84 and supports shaft 22 of the transporting roller for rotation with an impeller wheel 85. Contact bands 86 are attached to the inner surface of housing 83 in a plane of symmetry perpendicular to shaft 22 and are spaced from each other by gaps 87. The two semicircular contact bands are respectively connected by conductors to a voltage source and the source of light by which papers transported by a transporting roller are exposed. The metal powder 84 is conductive, and mercury or another electrically conductive liquid may be substituted.

In the position of rest shown in FIG. 11a, the impeller wheel, shaft 22 and transporting roller are at a standstill, and the metal powder fills the lower part of housing 83 below the level of the gaps 87 so that the circuit is interrupted.

When the transporting roller with shaft 22 and the impeller wheel 85 is rotated, the metal powder or metal liquid rotates and is driven by the centrifugal force into contact with the entire inner surface of the housing forming a conductive bridge across the gaps 87 so that the circuit is closed and the source of light energized.

The mass of the metal powder is selected so that below a predetermined minimum rotary speed of the impeller wheel 85, the centrifugal force of the powder is insufficient to hold the powder in a position bridging gaps 87 so that the powder drops into the lower portion of housing 83, and interrupts the circuit.

Figure 12A:
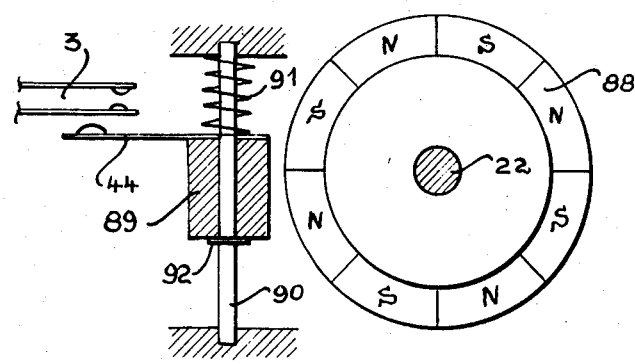
FIGS. 12a and 12b are fragmentary elevations, partially in section, illustrating two operational positions of a twelfth device.
Figure 12B:
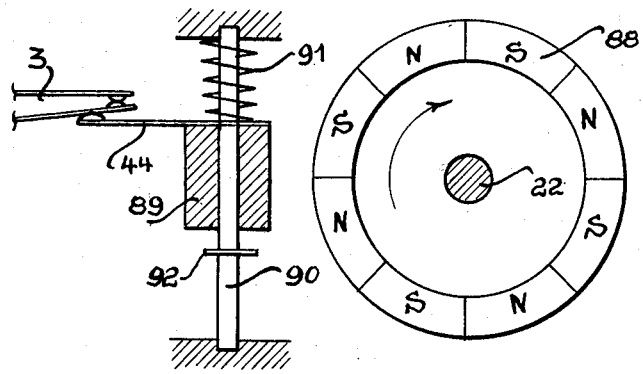

In the embodiment illustrated in FIGS. 12a and 12b, transporting roller shaft 22 carries an annular magnet 88 whose alternate segments are of a different polarity. A polarized permanent magnet 89 is movably mounted on a rod 90 and urged by a spring 91 against an abutment 92. An actuator arm 44 is secured to magnet 89 and cooperates with switch 3 which is located in the circuit of the source of light. In the position of rest in which the annular magnet 88 is at a standstill, there is no variation of the magnetic field, and actuating member 89 with arm 44 is held by a control spring 91 in a position in which switch 3 is open.

When the transporting roller with shaft 22 and annular magnet 88 rotates at a speed above a predetermined minimum speed, a magnetic force is exerted on actuating magnet 89, rising the same against the action of control spring 91 so that actuator arm 44 closes switch 3, as shown in FIG. 12b. Rod 90 is made of an antimagnetic material.

When the rotary speed of the transporting roller drops below the predetermined minimum speed, the action of the field produced by the rotary annular magnet 88 is insufficient to hold actuating magnet 89 in the raised disconnecting position, and the same drops back to abutment 92.

Figure 13A:
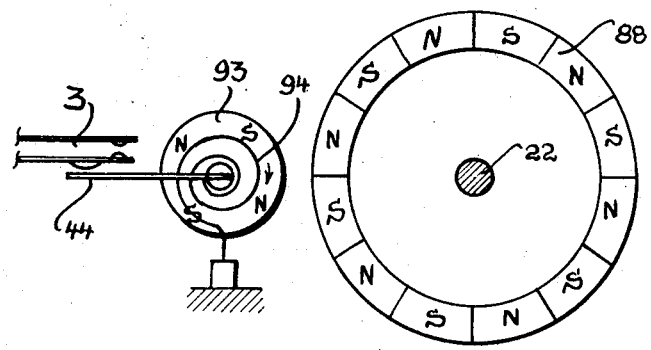
FIGS. 13a and 13b are fragmentary elevations, illustrating a thirteenth device in two operational positions.
Figure 13B:
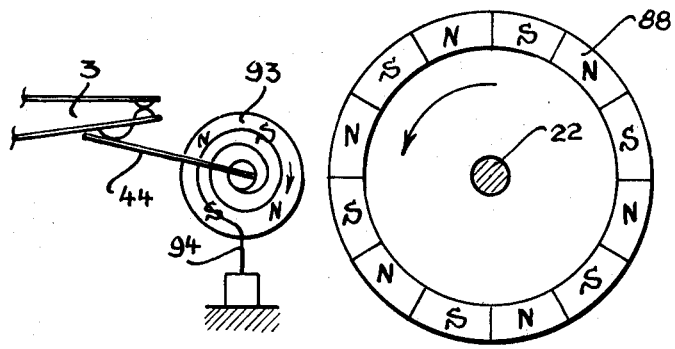

In the embodiment illustrated in FIGS. 13a and 13b alternating segments of different polarity rotate with shaft 22 of the transporting roller. Another polarized annular magnet 93 is mounted for rotation and carries an actuator arm 44. Annular magnet 93 is urged by a spiral spring 94 to turn to a position in which actuator arm 44 abuts a stop (not shown).

In the position of rest shown in FIG. 13a, shaft 22 of the transporting roller and the annular magnet 88 are at a standstill, and spring 94 turns actuator arm 44 to a position in which switch 3 is open.

When the transporting roller with the annular magnet 88 rotates at a speed higher than a predetermined minimum speed, the annular magnet 93 is urged to rotate with annular magnet 88 so that control spring 94 is tensioned while actuator arm 44 is turned to a position closing switch 3 so that the source of light is illuminated and exposes the photosensitive papers on the transporting roller.

When the speed of the transporting roller drops below the minimum speed at which the operation is safe, the force of control spring 94 is sufficient to overcome the force exerted by annular magnet 88 on annular magnet 93 so that actuator arm 44 returns to the position of FIG. 13a and switch 3 opens and interrupts the controlled circuit.

Figure 14A:
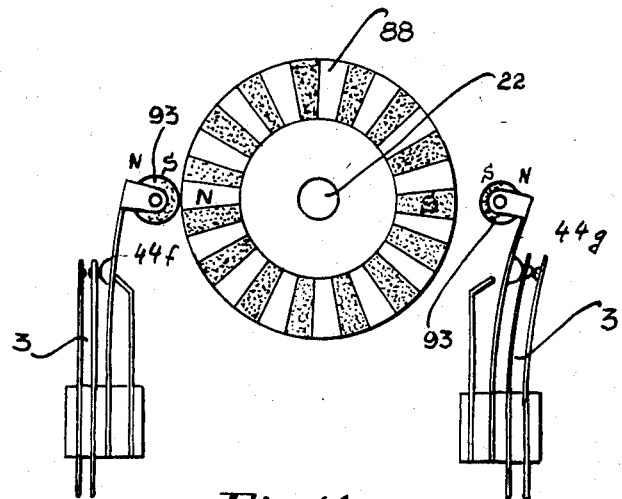
FIGS. 14a and 14b are fragmentary elevations illustrating a fourteenth device in two operational positions.
Figure 14B:
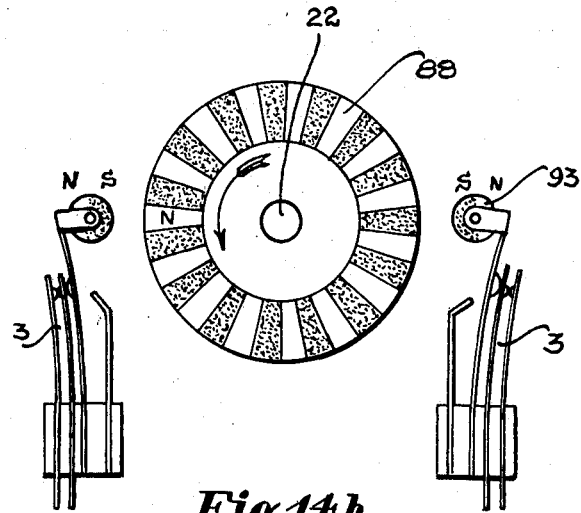

In the embodiment illustrated in FIGS. 14a and 14b, an annular magnet 88 having alternate sectors of different polarity rotates with shaft 22 of the transporting roller. Two small annular permanent magnets 93 are mounted on leaf springs on diametrically opposite sides of annular magnet 88. Magnets 93 cannot turn, but are cylindrical.

In the position of rest illustrated in FIG. 14a poles of different polarity of magnets 88 and 93 attract each other so that leaf spring arm 44f opens the respective switch 3, whereas poles of opposite polarity on the other side hold leaf spring arm 44g in a position closing switch 3. Magnets 93 have poles of the same polarity located opposite annular magnet 88 which has poles of different polarity on diametrically opposite points. Consequently, one of magnets 93 is always attracted.

In order to avoid a stopping of annular magnet 88 in an intermediate position in which the boundary between two adjacent different poles is located opposite magnets 93, annular magnet 88 is mounted on shaft 22 in such a manner as to be capable of turning a small angle as required for the attraction of one of the magnets 93.

The mass of magnets 93 is selected that at a certain minimum rotary speed of annular magnet 88, the force of springs 44f and 44g is insufficient to return the magnets 93 to the inner positions so that magnets 93 remain in the position shown in FIG. 14b in which both switches 3 are closed, and since switches 3 are connected in series, the source of light is connected to voltage. Below the minimum speed, the respective spring arm 44f or 44g returns the magnet 93 to an inner position when passed by a pole of annular magnet 88 of different polarity.

From the above description of the invention and similar devices emboding many features of the invention it becomes apparent that actuating means are provided for closing switches 3, and that the actuating means are controlled by control means which operatively connect the transporting roller and its shaft with the actuating means for moving the actuating means to a position opening the switch and disconnecting the source of light when the rotary member rotates at a speed below a predetermined minimum speed. The control means include means biasing the actuating means into the disconnecting position in which the switch is open, and the control means are designed to transmit to the actuating means a force overcoming the force of the biasing means when the rotary speed of the transporting roller exceeds the minimum speed so that the source of light can be safely illuminated. However, when the rotary speed of the transporting roller drops below the minimum speed, the force transmitted by the control means to the actuating means is insufficient to overcome the force of the biasing means, and the actuating means moves to a disconnecting position opening the switch in the circuit of the source of light.

While the invention has been illustrated and described as embodied in an apparatus for switching off the source of light of a copying apparatus when the speed of the transporting roller drops below a predetermined minimum speed at which overheating may take place, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. Switch actuating arrangement comprising, in combination, a rotary member; an electric circuit means causing rotation of said rotary member and including a switch means; a control shaft driven from said rotary member; a first abutment means secured to said control shaft; a second abutment means mounted on said control shaft for rotation with the same and for axial movement toward and away from said first abutment means and having an end position abutting the same; spring means connecting said first and second abutment means and urging said second abutment means away from said first abutment means; centrifugal weight means mounted on said spring means for radial movement between an inner position in which said first and second abutment means are spaced, and an outer position in which the same abut each other in said end position; a bell-shaped member connected with said shaft and said first abutment means for rotation therewith and having yieldable wall portions located opposite said centrifugal weight means and being engaged by the same in an intermediate position of said second abutment means so as to be resiliently deformed before said second abutment means arrives in said end position so that the impact of said second abutment means on said first abutment means is dampened by the deformation of said bell-shaped member; actuating means including an actuating member connected with said second abutment means for rotation and axial movement; and a follower means for sensing the axial position of said actuating member and operating said switch means to close and interrupt said circuit, respectively, when said rotary member rotates at a speed above and below a predetermined minimum speed, respectively, movement of said actuating means and of said switch means being terminated when said second abutment means abuts said first abutment means in said end position.

2. Switch actuating arrangement as claimed in claim 1 wherein said bell-shaped member has cutouts in portions located between said yieldable wall portions so that the resistance of said yieldable wall portion against deformation is reduced and axial movement of said second abutment means to said end position is gradually dampened.

3. Switch actuating arrangement as claimed in claim 2 wherein said spring means are leaf spring having end secured to said first and second abutment means, respectively, and centrally located portions carrying said centrifugal weight means, said leaf spring being bendable in radial planes so that said weight means move in radial planes passing through said yieldable portions and are not circumferentially displaced.

4. Switch actuating arrangement comprising, in combination, a rotary member; an electric circuit means causing rotation of said rotary member and including a switch means; a control shaft driven from said rotary member; a first abutment means secured to said control shaft; a second abutment means mounted on said control shaft for rotation with the same and for axial movement toward and away from said first abutment means and having an end position; spring means connecting said first and second abutment means and urging said second abutment means away from said first abutment means; centrifugal weight means mounted on said spring means for radial movement between an inner position and an outer position; a yieldable bell-shaped member connected with said shaft and said first abutment means for rotation therewith and being engaged by said centrifugal weight means in said outer position of the same whereby movement of said second abutment means is terminated in said end position; actuating means including an actuating member connected with said second abutment means for rotation and axial movement, and a follower means for sensing the axial position of said actuating member and operating said switch means to close and interrupt said circuit, respectively, when said rotary member rotates at a speed above and below a predetermined minimum speed, respectively, movement of said actuating means and of said switch means being terminated when said second abutment means is in said end position.

References Cited

UNITED STATES PATENTS

| | | | |
|---|---|---|---|
| 1,611,340 | 12/1926 | David et al. | 340—264 |
| 2,234,309 | 3/1941 | Kromholz | 340—264 |
| 3,129,300 | 4/1964 | Moyles | 200—61.46 |

FOREIGN PATENTS

| | | |
|---|---|---|
| 1,011,548 | 6/1952 | France. |
| 254,331 | 1930 | Italy. |

HERMAN O. JONES, Primary Examiner

R. A. VANDERHYE, Assistant Examiner

U.S. Cl. X.R.

200—80; 340—264